(12) United States Patent
Kushida et al.

(10) Patent No.: US 10,746,583 B2
(45) Date of Patent: Aug. 18, 2020

(54) WATER CONTENT MEASURING DEVICE, MEASURING METHOD, AND IMAGE FORMING DEVICE

(71) Applicant: Ricoh Company, Ltd., Tokyo (JP)

(72) Inventors: Yohei Kushida, Kanagawa (JP); Keita Maejima, Kanagawa (JP); Hiroshi Okamura, Kanagawa (JP); Natsuko Ishizuka, Kanagawa (JP); Hayato Fujita, Kanagawa (JP); Masaki Tsugawa, Kanagawa (JP); Yuji Ikeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 225 days.

(21) Appl. No.: 15/964,521

(22) Filed: Apr. 27, 2018

(65) Prior Publication Data

US 2018/0321074 A1 Nov. 8, 2018

(30) Foreign Application Priority Data

May 2, 2017 (JP) .................................. 2017-091720

(51) Int. Cl.
| | |
|---|---|
| *G01F 23/24* | (2006.01) |
| *G03G 13/10* | (2006.01) |
| *G01F 23/26* | (2006.01) |
| *G03G 15/00* | (2006.01) |
| *G01N 27/22* | (2006.01) |

(52) U.S. Cl.
CPC .............. *G01F 23/24* (2013.01); *G01F 23/26* (2013.01); *G01F 23/268* (2013.01); *G03G 13/10* (2013.01); *G03G 15/5029* (2013.01); *G01N 27/223* (2013.01)

(58) Field of Classification Search
CPC .... G01F 23/266; G01F 23/263; G01F 23/268; G01F 23/265; G01F 23/241; G01F 23/24;
(Continued)

(56) References Cited

U.S. PATENT DOCUMENTS

| | | | | | |
|---|---|---|---|---|---|
| 3,408,566 | A | * | 10/1968 | Norwich .............. | G01N 27/223 324/683 |
| 3,504,280 | A | * | 3/1970 | Byrd .................... | G01N 27/223 324/667 |

(Continued)

FOREIGN PATENT DOCUMENTS

| | | |
|---|---|---|
| JP | 3133862 | 11/2000 |
| JP | 2003-29904 | 1/2003 |

(Continued)

*Primary Examiner* — John Fitzgerald
*Assistant Examiner* — Truong D Phan
(74) *Attorney, Agent, or Firm* — Xsensus LLP

(57) ABSTRACT

A water content measuring device measures water content of an object to be measured. The water content measuring device includes two plate members that are disposed facing each other, a current generating unit, a measuring unit, and an arithmetic processing unit. The current generating unit generates current supplied between the two plate members. The measuring unit measures electrostatic capacitance generated by the current supplied between the two plate members. The arithmetic processing unit is configured to convert the electrostatic capacitance measured by the measuring unit to water content. Two plate members each have a shape or are disposed such that at least two points on a leading edge of the object enter between the two plate members at different timings in a direction perpendicular to a passing direction in which the object passes through the two plate members.

6 Claims, 8 Drawing Sheets

(58) Field of Classification Search
CPC ...... G01F 23/26; G01N 33/246; G01N 25/56;
G01N 27/223; G01N 27/221; G01N
27/226; G01N 27/22; G01N 27/225;
G01N 27/048; G01N 27/07; G01R 27/02;
B60S 1/0822; B60S 1/0818; B32B
17/10036; G05D 9/12; G03G 13/10;
G03G 15/5029
USPC ......... 73/304 C, 73; 324/658, 663, 664, 689,
324/694, 695; 340/602; 361/178, 286
See application file for complete search history.

(56) References Cited

U.S. PATENT DOCUMENTS 4,610,530 A * 9/1986 Lehmbeck ........... G01N 27/223
399/45
2001/0048428 A1  12/2001 Ukita et al.
2006/0201236 A1 * 9/2006 Taira ................... G01N 33/346
73/73
2007/0058019 A1 * 3/2007 Saitoh .................... B41J 11/002
347/101
2011/0025790 A1 * 2/2011 Serizawa ............. B41J 2/17509
347/86
2011/0102182 A1 * 5/2011 Ohya ................... G01N 33/497
340/576
2012/0313650 A1 * 12/2012 Kawaguchi ........... H01M 10/04
324/679
2013/0063163 A1 * 3/2013 Sim ...................... G01N 27/223
324/663

FOREIGN PATENT DOCUMENTS

JP       2008-143638         6/2008
JP       2012132794    *    7/2012
JP       2016-164624         9/2016

* cited by examiner

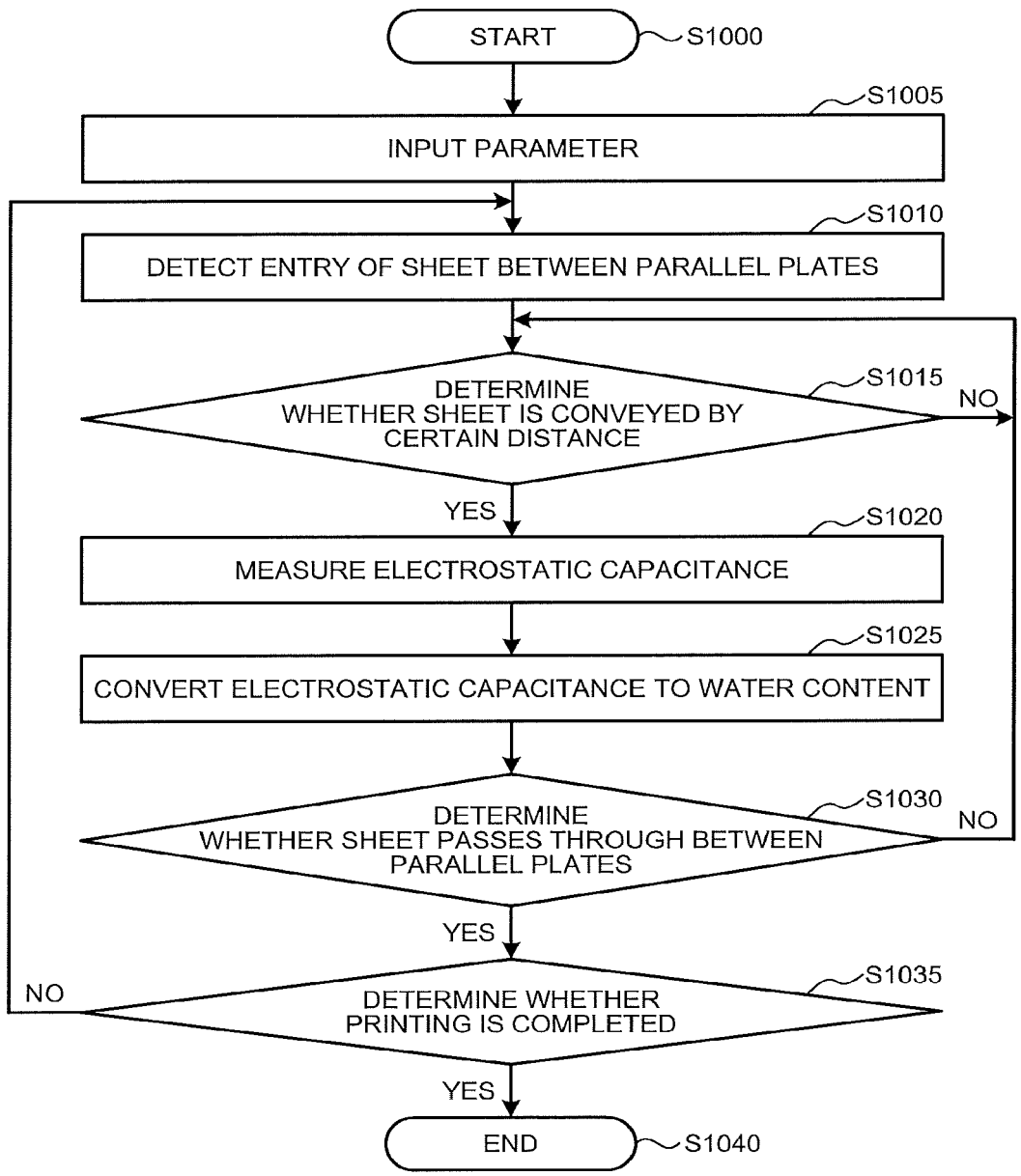

WATER CONTENT MEASURING DEVICE, MEASURING METHOD, AND IMAGE FORMING DEVICE

CROSS-REFERENCE TO RELATED APPLICATIONS

The present application claims priority under 35 U.S.C. § 119 to Japanese Patent Application No. 2017-091720, filed on May 2, 2017. The contents of which are incorporated herein by reference in their entirety.

BACKGROUND OF THE INVENTION

1. Field of the Invention

The present invention relates to a water content measuring device, a measuring method, and an image forming device.

2. Description of the Related Art

In a copier, a printer, a facsimile, a multifunction peripheral including these functions, and the like, which use an electrophotographic process; water content included in a recording medium (sheet) to which toner is attached affects quality of an image formed on the recording medium and conveyance of the recording medium.

In view of the foregoing, there has been proposed a technique for measuring water content of a sheet using an electrostatic capacitance sensor so as to reflect the water content on image forming control (for example, Japanese Patent No. 3133862).

However, in the conventional technique, there is one electrostatic capacitance sensor and only water content of one spot on a sheet can be measured. Thus, a water content distribution on the sheet cannot be obtained.

A plurality of electrostatic capacitance sensors can be used in order to implement image forming control depending on a water content distribution, but there is a problem in that it costs a lot and control becomes complicated.

SUMMARY OF THE INVENTION

According to one aspect of the present invention, a water content measuring device measures water content of an object to be measured. The water content measuring device includes two plate members that are disposed facing each other, a current generating unit, a measuring unit, and an arithmetic processing unit. The current generating unit generates current supplied between the two plate members. The measuring unit measures electrostatic capacitance generated by the current supplied between the two plate members. The arithmetic processing unit is configured to convert the electrostatic capacitance measured by the measuring unit to water content. Two plate members each have a shape or are disposed such that at least two points on a leading edge of the object enter between the two plate members at different timings in a direction perpendicular to a passing direction in which the object passes through the two plate members.

BRIEF DESCRIPTION OF THE DRAWINGS

FIG. 10 is a flowchart illustrating a third example of processing that is executed by the water content measuring device.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
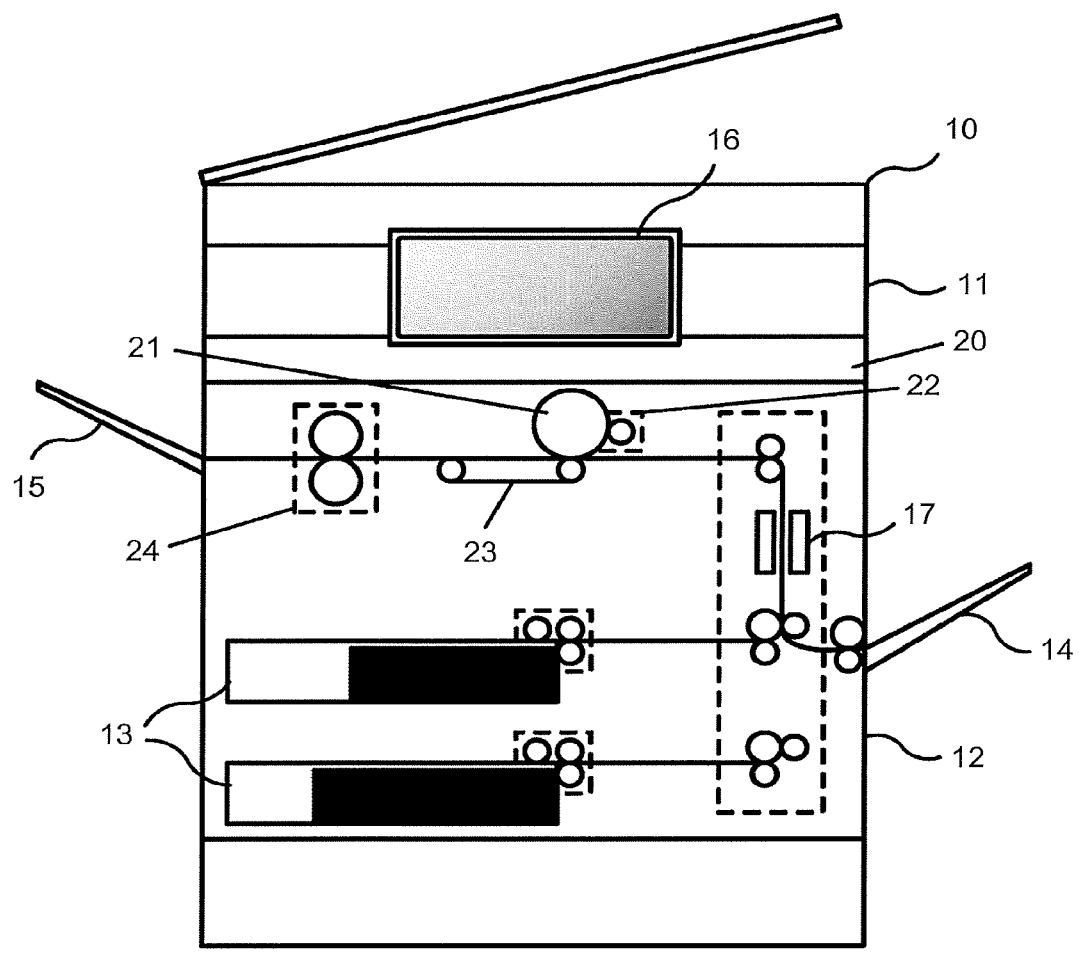
FIG. 1 is a view illustrating a configuration example of an image forming device.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a water content measuring device capable of obtaining a water content distribution of an object to be measured using one device, a measuring method of the water content distribution of an object to be measured, and an image forming device that includes the water content measuring device.

FIG. 1 is a view illustrating a configuration example of an image forming device. The image forming device illustrated in FIG. 1 is a multifunction peripheral that has functions of a copier, a printer, a facsimile, and a scanner, but the image forming device may be a copier, a printer, a facsimile, a scanner, and the like.

The image forming device is formed of a plurality of devices and units. The image forming device includes an automatic document feeder (ADF) 10, an image reading device 11, a printer unit 12, a sheet feeding unit 13, a manual sheet feeding unit 14, a paper ejection 15, an operation panel 16, and an electrostatic capacitance sensor 17 as a water content measuring device. This is one example, and the image forming device does not necessarily include the ADF 10, the manual sheet feeding unit 14, and the like and may include other devices and units.

The ADF 10 includes a document table on which a document is placed, a conveying mechanism that conveys a document on the document table, and a discharge tray that discharges the conveyed document, and moves a document on a contact glass of the image reading device 11. The image reading device 11 includes a light source, a plurality of mirrors, an image forming lens, and an imaging element, and irradiates a document on the contact glass with light from the light source and causes the reflected light to enter the imaging element through the mirrors and the image forming lens. Examples of the imaging element can include a charged coupled device (CCD) image sensor, a complementary metal oxide semiconductor (CMOS) image sensor, and the like, and the imaging element converts entering light to an electrical signal and outputs the electrical signal as image data.

The printer unit 12 includes a writing unit 20, a photoconductor drum 21, a developing device 22, a conveying belt 23, and a fixing device 24. The writing unit 20 receives an instruction from a controller that controls the image forming device, irradiates the photoconductor drum 21 with light, and forms a latent image on a surface of the photoconductor drum 21. The developing device 22 is filled with toner, discharges the toner to the photoconductor drum 21, and develops a latent image formed on a surface of the photoconductor drum 21. The conveying belt 23 conveys a sheet, and transfers an image that is developed by developing on the sheet. The fixing device 24 applies heat and pressure to a sheet that has an image transferred thereon and is conveyed by the conveying belt 23 so as to fix the image on the sheet.

The sheet feeding unit 13 includes a sheet feeding tray in which sheets are housed and a sheet feeding roller that feeds sheets housed in the sheet feeding tray one by one, and receives an instruction from the controller and supplies a sheet. The manual sheet feeding unit 14 includes a manual sheet feeding tray on which sheets are placed and a sheet feeding roller that feeds sheets on the manual sheet feeding tray one by one, and receives an instruction from the controller and supplies a sheet. The paper ejection 15 includes a paper ejection tray that ejects a sheet on which an image is fixed by the fixing device 24.

The operation panel 16 receives an operation of a user, and instructs the controller to execute reading, print, and the like, of a document. The operation panel 16 displays buttons for selecting functions in order to receive operation of a user, start buttons and the like for executing print and the like, and displays the execution state, error, and the like.

The electrostatic capacitance sensor 17 is provided in a conveying path where a sheet fed from the sheet feeding unit 13 or the manual sheet feeding unit 14 is conveyed. The conveyed sheet passes through between parallel plates serving as two plate members forming the electrostatic capacitance sensor 17. The parallel plates have conductivity, and are formed of two plates that include surfaces facing each other. The two plates have the same shape, the same size, and the same thickness. A metal plate can be used as the parallel plates, and examples of the metal plate can include a stainless plate, a copper plate, and an aluminum plate. A mounting position of the parallel plates may be any one of the following: in the sheet feeding unit 13, in the manual sheet feeding unit 14, and between the sheet feeding unit 13 or the manual sheet feeding unit 14 and the photoconductor drum 21.

Figure 2:
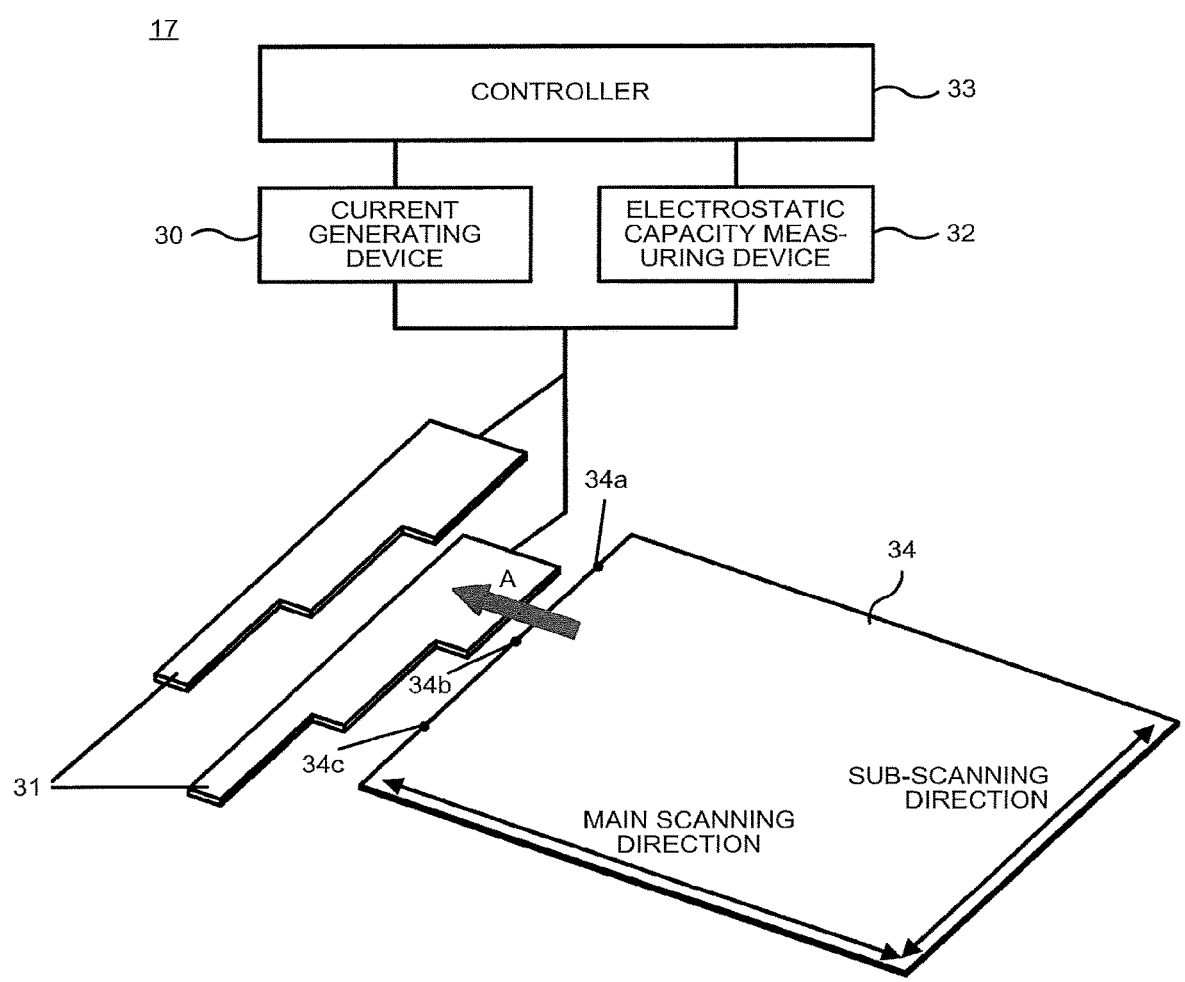
FIG. 2 is a view illustrating a configuration example of an electrostatic capacitance sensor as a water content measuring device.

FIG. 2 is a view illustrating a configuration example of the electrostatic capacitance sensor 17. The electrostatic capacitance sensor 17 includes a current generating device 30, parallel plates 31, an electrostatic capacitance measuring device 32, and a controller 33. The parallel plates 31 have conductivity, and are formed of two plates that are disposed apart in parallel with each other. A sheet 34 as a recording medium enters between the parallel plates 31, and passes through between the parallel plates 31.

The current generating device 30 generates current having a predetermined current value to be supplied between the parallel plates 31. When current is supplied between the parallel plates 31, the parallel plates 31 function as a capacitor, and an electrical charge is stored between the parallel plates 31. An amount of the stored electrical charge is called electrostatic capacitance. The electrostatic capacitance C(F) can be calculated by the following expression (1) where the area of each of the parallel plates 31 is defined as S (m$^2$), a gap between the parallel plates 31 is defined as d (m), and a dielectric constant is defined as ε.

$$C = \varepsilon \frac{S}{d} \quad (1)$$

When a current is supplied between the parallel plates 31, the current does not flow between the parallel plates due to an insulator such as air existing between the parallel plates 31. However, polarization where one plate serves as a positive electrode and the other serves as a negative electrode is generated, so that an electrical charge can be stored. The dielectric constant ε is a value that represents a magnitude of this polarization, and varies due to an insulator existing between the parallel plates 31. The dielectric constant ε varies depending on whether the insulator between the parallel plates 31 is only air or includes a sheet when the sheet passes through between the parallel plates 31. Because water conducts electricity, the dielectric constant ε differs between a dry sheet and a sheet containing moisture (water), and varies depending on the water content of a sheet. In addition, when water content is not uniform and water content is distributed in one sheet, the dielectric constant ε varies depending on a position on the sheet.

Examples of the electrostatic capacitance measuring device 32 can include an inductance-capacitance-resistance (LCR) meter that causes alternating current (AC) to flow between the parallel plates 31 serving as an object to be measured, detects amplitude ratio and a phase difference between a voltage signal and a current signal, calculates impedance R from the detected amplitude ratio and phase difference, and calculates inductance L and electrostatic capacitance C from frequency of the impedance R and AC. In this embodiment, the LCR meter is used as one example of the electrostatic capacitance measuring device 32, but the electrostatic capacitance measuring device is not limited to the LCR meter. The electrostatic capacitance measuring device 32 can be any device capable of measuring the electrostatic capacitance C.

The controller 33 controls the current generating device 30 and the electrostatic capacitance measuring device 32, and performs arithmetic processing for converting the electrostatic capacitance C measured by the electrostatic capacitance measuring device 32 to a water content. The controller 33 holds, for example, a table that indicates a relation between the electrostatic capacitance C and water content, and can convert the electrostatic capacitance C measured using the table to water content. The conversion to water content is not limited to the conversion executed using the table, and may be conversion executed using a conversion equation and the like.

The controller 33 can include, in order to execute control of the current generating device 30 and the like, and arithmetic processing such as conversion to water content, a read only memory (ROM) and a flash memory as a storage device that stores a control program, a conversion program, and the like. The controller 33 can include a central processing unit (CPU) that reads and executes a computer program from the storage device, a random access memory (RAM) that provides a work area to the CPU, and the like.

The parallel plates 31 each have a shape or each are disposed such that at least two points on the leading edge of the sheet enter between the parallel plates 31 at different timings in a direction (sub-scanning direction) perpendicular to a passing direction (main scanning direction) in which the sheet 34 passes through between the parallel plates 31. In the example illustrated in FIG. 2, the parallel plates 31 each have a stepped shape in which lengths in the main scanning direction are different in three steps, so that three points 34a, 34b, and 34c on the leading edge of the sheet 34 corresponding to the respective steps enter between the parallel plates 31 not at the same time but shifted in time.

The shape of each of the parallel plates 31 is not limited to the three-stepped shape illustrated in FIG. 2, and may be a two-stepped shape and a four-stepped shape or more, a tapered shape having different lengths in the main scanning direction, and the like. Alternatively, the parallel plates 31 may each have a rectangular shape and be disposed not in parallel to the leading edge of the sheet 34 but inclined at a predetermined angle with respect to the leading edge of the sheet 34. The shape or disposition of the parallel plates 31 is not limited to these examples, and may be any shape or disposition in which at least two points on the sheet 34 in the sub-scanning direction enters between the parallel plates 31 at different timings. The following describes a case where the parallel plates 31 each having a stepped shape are used.

Figure 3:
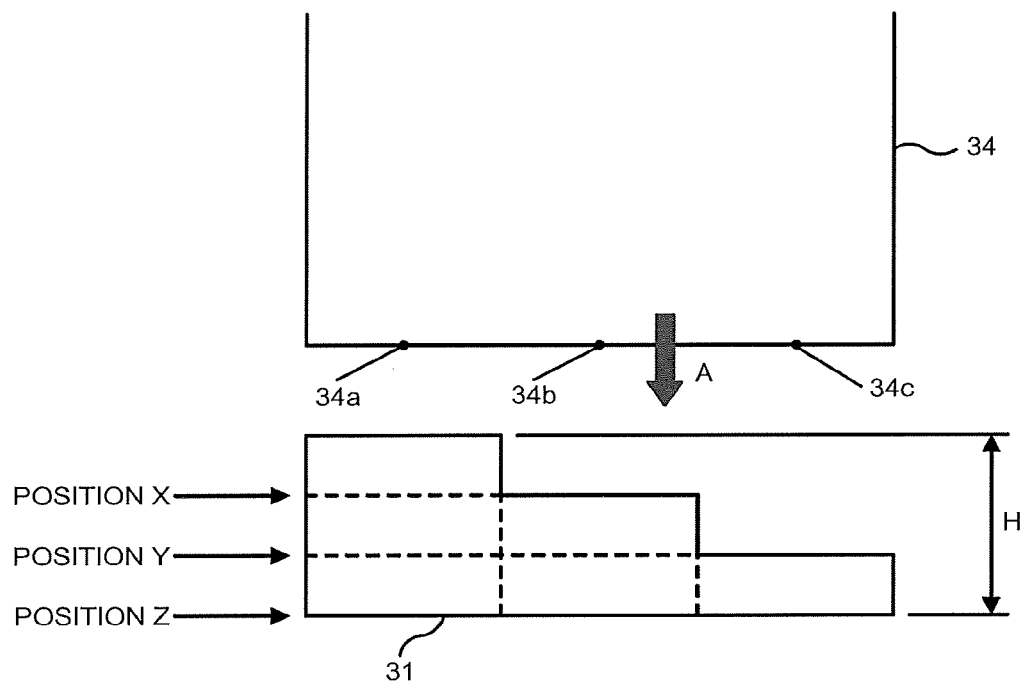
FIG. 3 is a view illustrating parallel plates and a sheet when viewed from the top.

FIG. 3 is a view illustrating the parallel plates 31 and the sheet 34 when viewed from the top. The sheet 34 has long sides in the main scanning direction that is a conveying direction as indicated by an arrow A and has short sides in the sub-scanning direction. A conveying destination of the sheet 34 is the parallel plates 31 each of which one end has a stepped shape having different lengths in tree steps in the main scanning direction. In FIG. 3, the parallel plates 31 each have the longest length at the left side in the main scanning direction, and each have the shorter length that reduced stepwise toward the right side. In the parallel plates 31 illustrated in FIG. 3, the longest length in the main scanning direction is defined as H.

The points 34a, 34b, and 34c on the leading edge of the sheet 34 are at the left side, the center, and the right side, respectively, in a single line in the sub-scanning direction. When the sheet 34 moves in the conveying direction as indicated by an arrow A and enters between the parallel plates 31, the point 34a enters between the parallel plates 31 first, the point 34b enters between the parallel plates 31 with delay in time, and the point 34c enters between the parallel plates 31 with more delay in time. In other words, the points 34a, 34b, and 34c on the sheet 34 enter between the parallel plates 31 in sequence as the sheet 34 is conveyed at a certain distance.

Figure 4:
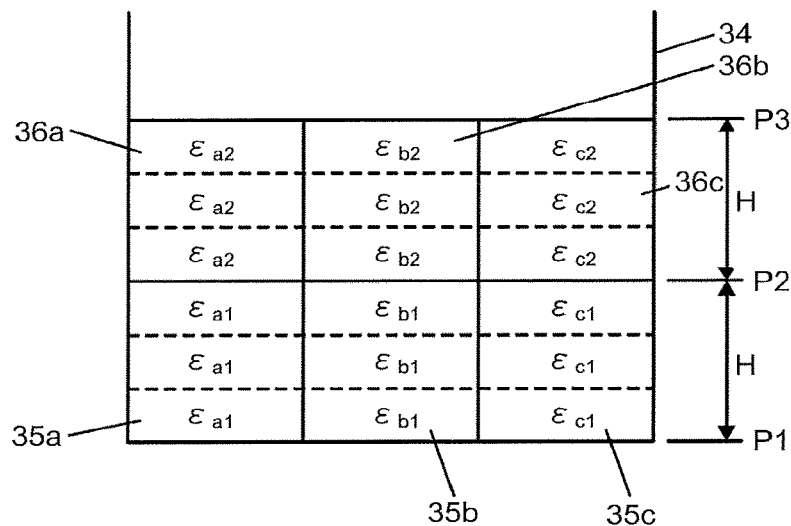
FIG. 4 is a view illustrating an example of the distribution of a dielectric constant of the sheet.

FIG. 4 is a view illustrating an example of the distribution of the dielectric constant ε of the sheet 34. When the sheet 34 does not yet enter between the parallel plates 31 or after the sheet 34 passes through between the parallel plates 31, a dielectric constant $\varepsilon_0$ of the air is always a contact value without being affected by environmental changes such as a sheet temperature and moisture.

In the example illustrated in FIG. 4, when the sheet 34 is conveyed between the parallel plates 31, the dielectric constant ε differs for each length H in the main scanning direction of the sheet 34 and for each area 35a, 35b, and 35c into which the sheet 34 is divided from the left side, the center, and the right side. In other words, the dielectric constant when the area 35a on the left side and having the length H from the point P1 (i.e., the leading edge) to the point P2 of the sheet 34 enters between the parallel plates 31 is defined as $\varepsilon_{a1}$, the dielectric constant when the area 35b at the center enters between the parallel plates 31 is defined as $\varepsilon_{b1}$, and the constant when the area 35c on the right side enters between the parallel plates 31 is defined as $\varepsilon_{c1}$. The dielectric constant when an area 36a on the left side and having the length H from the point P2 to the point P3 of the sheet 34 enters between the parallel plates 31 is defined as $\varepsilon_{a2}$, the dielectric constant when an area 36b at the center enters between the parallel plates 31 is defined as $\varepsilon_{b2}$, and the constant when an area 36c on the right side enters between the parallel plates 31 is defined as $\varepsilon_{c2}$.

The length H can be arbitrarily set, and can be set to a suitable length corresponding to a water content distribution on the sheet 34. The number of steps in a stepped shape can also be arbitrarily set to a suitable number of steps corresponding to a water content distribution on the sheet 34.

Figure 5:
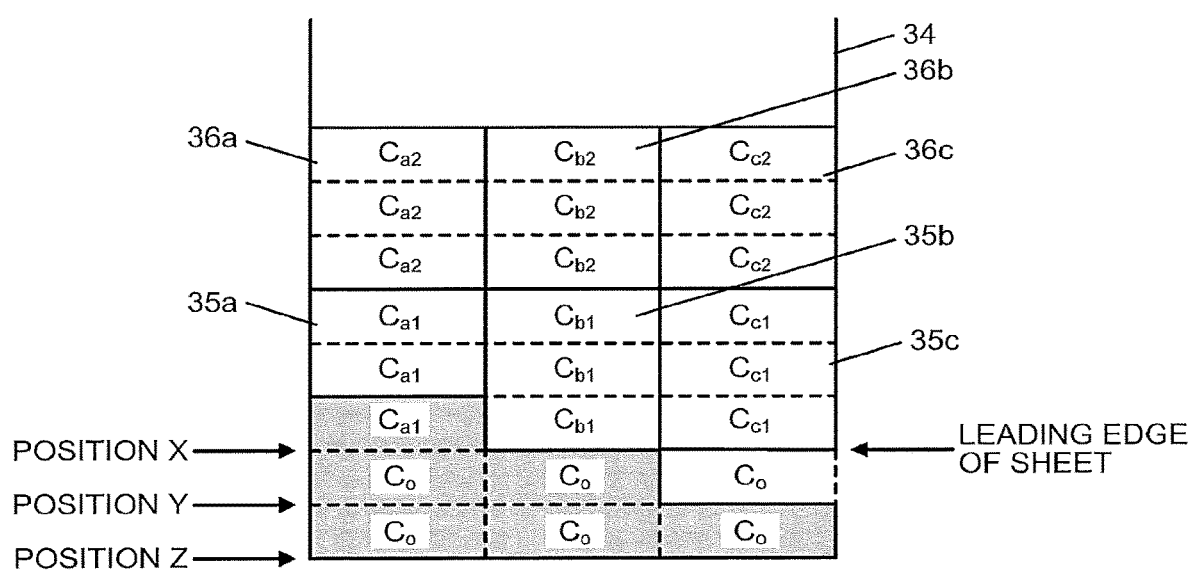
FIG. 5 is a view illustrating an example where a sheet is conveyed and the leading edge of the sheet enters between the parallel plates.

FIG. 5 is a view illustrating a case where the leading edge of the sheet 34 moves to the position X, and a part of the sheet 34 enters between the parallel plates 31. In the example illustrated in FIG. 5, a gap d between the parallel plates 31 is constant, an area S of the parallel plate 31 is divided in six, the area 35a of the sheet 34 enters between the parallel plates 31, and the other areas 35b, 35c, and 36a to 36c do not enter yet. In this example, one of the three equal areas obtained by dividing each of the areas 35a to 35c and 36a to 36c into three is equal to one of the six areas obtained by dividing the area (hatching region) of the parallel plate 31 into six.

In FIG. 5, electrostatic capacitance is measured when the sheet 34 is conveyed by a certain distance, in other words, by a distance of one third of the length H (i.e., H/3). The measured electrostatic capacitance C is composite capacitance of electrostatic capacitance $C_{a1}$ when the area 35a of the sheet 34 enters between the parallel plates 31 and electrostatic capacitance $C_0$ of the air. The electrostatic capacitance C is based on a volume ratio of the measured area that varies every time the sheet 34 is conveyed between the parallel plates 31 by a certain distance, in other words, on the ratio of the volume of a measured area in which the electrostatic capacitance $C_{a1}$ is measured and the volume of a measured area in which the electrostatic capacitance $C_0$ is measured.

In the example illustrated in FIG. 5, the ratio of the volume of a measured area in which the electrostatic capacitance $C_{a1}$ is measured and the volume of a measured area in which the electrostatic capacitance $C_0$ of the air is measured can be, if the gap d is made constant, determined by the area S, and is 1:5. Thus, the electrostatic capacitance $C_{a1}$ can be measured using the measured electrostatic capacitance C, the volume ratio, and the previously calculated electrostatic capacitance $C_0$ by subtracting $5*C_0$ from the electrostatic capacitance C. When the electrostatic capacitance of air is measured between the plates, the total capacitance measured is $6*C_0$ as the space between the plates includes six $C_0$ regions.

Figure 6:
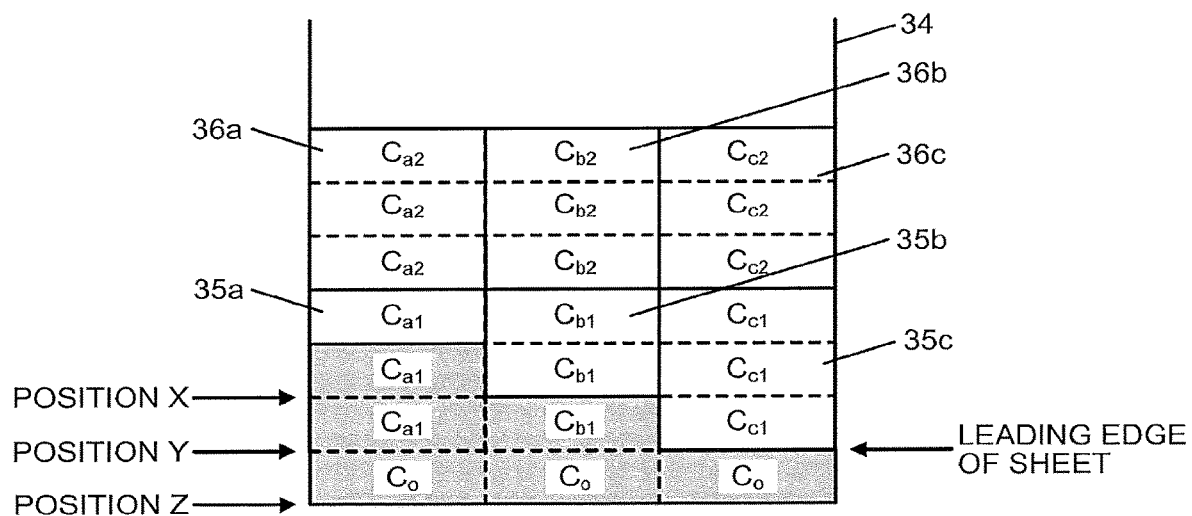
FIG. 6 is a view illustrating an example where the sheet is conveyed by a certain distance and the sheet enters between the parallel plates.

FIG. 6 is a view illustrating a case where the leading edge of the sheet 34 moves to a position Y, and the sheet 34 further enters between the parallel plates 31. In the example illustrated in FIG. 6, the area 35*b* of the sheet 34 in addition to the area 35*a* enters between the parallel plates 31, but the areas 35*c*, 36*a*, 36*b*, and 36*c* does not yet enter between the parallel plates 31.

In FIG. 6, electrostatic capacitance is measured when the sheet 34 is conveyed by a certain distance from the position illustrated in FIG. 5. The measured electrostatic capacitance C is composite capacitance of the electrostatic capacitance $C_{a1}$ when the area 35*a* enters between the parallel plates 31, electrostatic capacitance $C_{b1}$ when the area 35*b* enters between the parallel plates 31, and electrostatic capacitance $C_0$ of the air. In this case, the ratio of the volume of a measured area in which the electrostatic capacitance $C_{a1}$ is measured, the volume of a measured area in which the electrostatic capacitance $C_{b1}$ is measured, and the volume of a measured area in which the electrostatic capacitance $C_0$ of the air is measured can be, if the gap d is made constant, determined by the area S, and is 2:1:3. The electrostatic capacitance $C_{a1}$ is already calculated, and the electrostatic capacitance $C_{b1}$ can be calculated using the measured electrostatic capacitance C, the volume ratio, and the previously calculated electrostatic capacitance $C_0$ and $C_{a1}$ in the same manner as described above.

Figure 7:
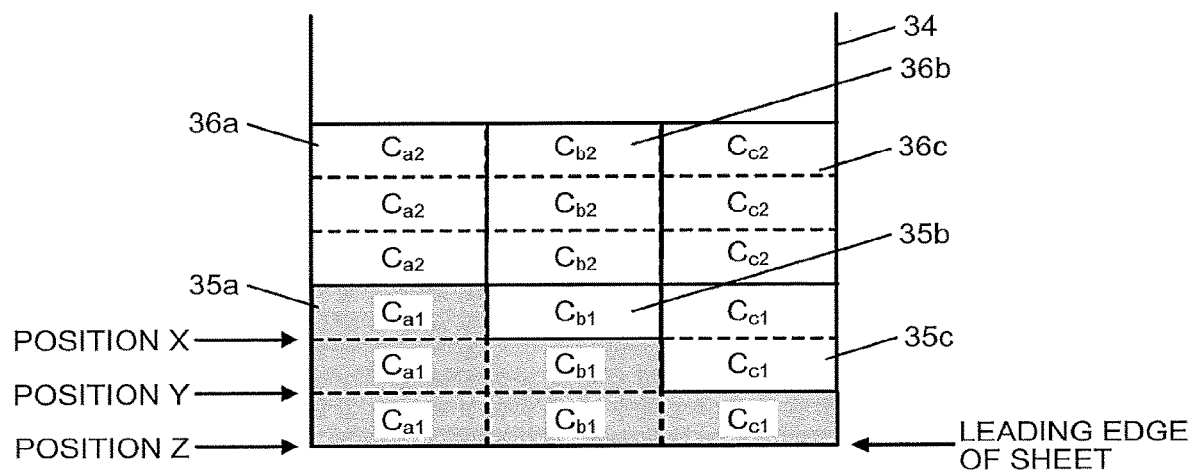
FIG. 7 is a view illustrating an example where the sheet is conveyed by a certain distance and the sheet is further enters between the parallel plates.

FIG. 7 is a view illustrating a case where the leading edge of the sheet 34 moves to a position Z, and the sheet 34 further enters between the parallel plates 31. In the example illustrated in FIG. 7, the area 35*c* of the sheet 34 in addition to the areas 35*a* and 35*b* enters between the parallel plates 31.

In FIG. 7, electrostatic capacitance is measured when the sheet 34 is conveyed by a certain distance from the position illustrated in FIG. 6. The measured electrostatic capacitance C is composite capacitance of the electrostatic capacitance $C_{a1}$ when the area 35*a* enters between the parallel plates 31, the electrostatic capacitance $C_{b1}$ when the area 35*b* enters between the parallel plates 31, and electrostatic capacitance $C_{c1}$ when the area 35*c* enters between the parallel plates 31. In this case, the ratio of the volume of a measured area in which the electrostatic capacitance $C_{a1}$ is measured, the volume of a measured area in which the electrostatic capacitance $C_{b1}$ is measured, and the volume of a measured area in which the electrostatic capacitance $C_{c1}$ is measured can be, if the gap d is made constant, determined by the area S, and is 3:2:1. The electrostatic capacitances $C_{a1}$ and $C_{b1}$ are already calculated, and the electrostatic capacitance $C_{c1}$ can be calculated using the measured electrostatic capacitance C, the volume ratio, and the previously calculated electrostatic capacitances $C_{a1}$ and $C_{b1}$ in the same manner as described above.

The electrostatic capacitance of each area on the sheet 34 can be calculated by repeating the steps illustrated in FIGS. 5 to 7, and a water content distribution on the sheet can be obtained by converting the electrostatic capacitance of each area to the water content.

Figure 8:
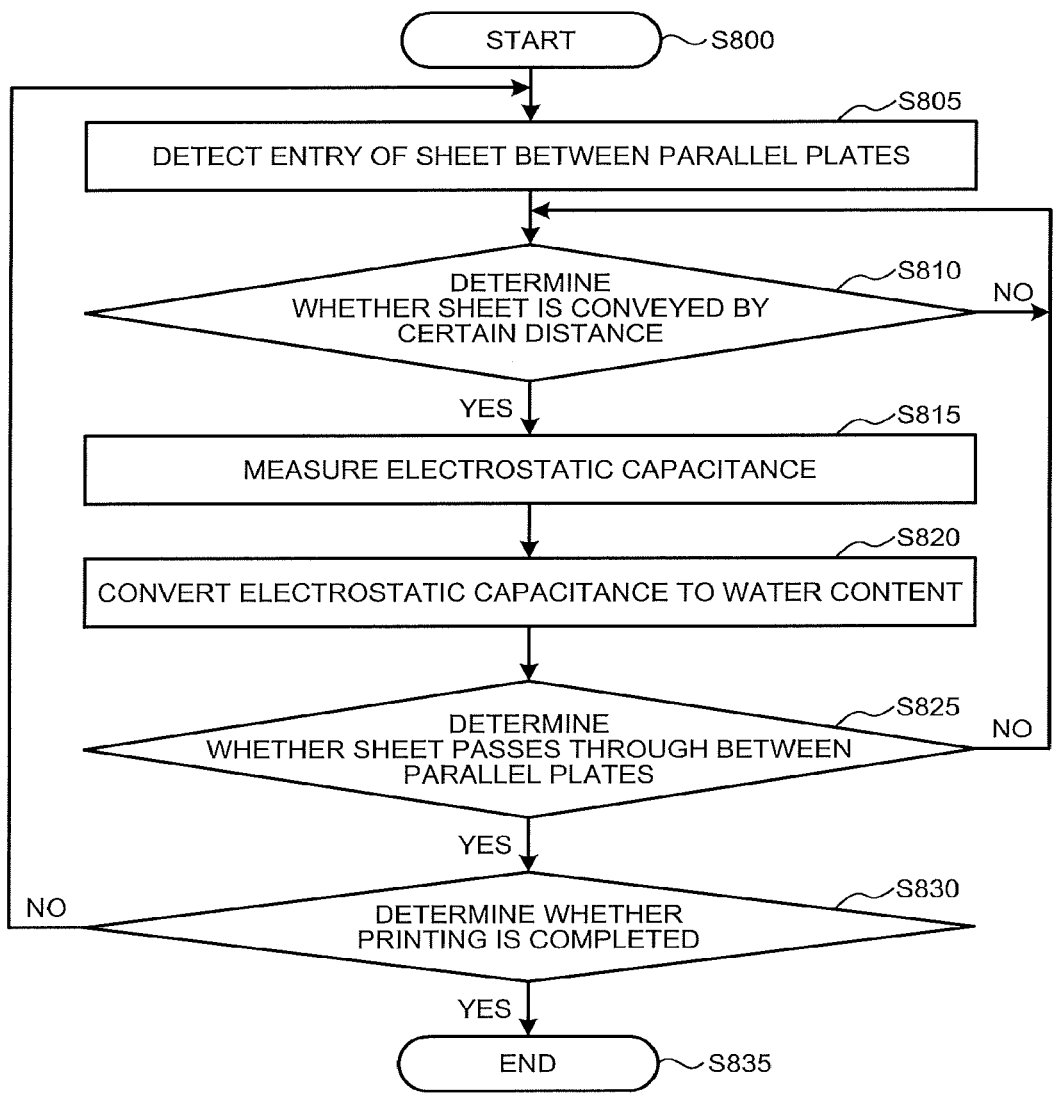
FIG. 8 is a flowchart illustrating a first example of processing that is executed by a water content measuring device.

FIG. 8 is a flowchart illustrating an example of processing for measuring water content. In response to the start of printing, processing starts at step S800. At step S805, the sheet 34 starts to be conveyed between the parallel plates 31, and it is detected that the leading edge of the sheet 34 has entered between the parallel plates 31. Entry of the sheet 34 between the parallel plates 31 can be detected by changes in measured electrostatic capacitance. For example, when electrostatic capacitance changes more than a certain amount, it is detected that the sheet 34 has entered between the parallel plates 31.

At step S810, it is determined whether the sheet 34 is conveyed by a certain distance. The certain distance is a distance from the point at which the leading edge of the sheet 34 starts to enter between the parallel plates 31 to the point at which the leading edge reaches the position X. This distance is the same as a distance from the position X to the position Y and as a distance from the position Y to the position Z. Thus, when the length H is used, a certain distance is defined as H/3. When the sheet 34 is not conveyed by the certain distance, determination at step S810 is repeated until the sheet is conveyed by the certain distance. When the sheet 34 is conveyed by the certain distance, the process goes to step S815.

At step S815, the electrostatic capacitance measuring device 32 measures electrostatic capacitance at that point. At step S820, the controller 33 acquires the measured electrostatic capacitance, and converts the electrostatic capacitance to water content using a table and the like. The converted water content can be stored in a storage device. The controller 33 can store, at the time of storing the converted water content, the converted water content in association with area identification information for identifying an area in the sheet 34 on which the electrostatic capacitance being a conversion source is measured. In this manner, a water content distribution can be output as a drawing and the like to a display device and the like.

At step S825, it is determined whether the sheet 34 passes through between the parallel plates 31. In other words, it is determined whether the trailing edge of the sheet 34 has passed through the parallel plates 31. Whether the sheet 34 has passed through the parallel plates 31 can be determined by measuring electrostatic capacitance and depending on whether the measured electrostatic capacitance indicates almost the same value as the electrostatic capacitance $C_0$ of the air. Almost the same value means that a value is within a certain error range.

If the sheet 34 has not passed through the parallel plates 31, the process goes back to step S810, and processing at steps S810 to S825 is repeated. If the sheet 34 has passed through the parallel plates 31, the process goes to step S830 and it is checked whether printing is completed. Because the number of printing sheets is designated at the time of printing, whether printing is completed can be determined by counting the number of sheets 34 having been passed through the parallel plates 31 and checking whether the counted count value reaches the number of printing sheets. If printing is not completed, the next sheet 34 is conveyed, and the process goes back to step S805 and the processing at steps S805 to S830 is repeated. If printing is completed, this processing ends at step S835.

In the electrostatic capacitance sensor 17, even when there is no error of the area between the parallel plates 31 and there is no positional deviation in a horizontal direction between the parallel plates 31, there may be an error of a gap between the parallel plates 31. In addition, even when there is no error of the gap, there may be an error of the area; or even when there is no error of the area, there may be a positional deviation in a horizontal direction between the parallel plates 31.

In this case, an error and a positional deviation can be calculated and corrected by: measuring electrostatic capacitance before the sheet 34 enters between the parallel plates 31, in other words, in a state where nothing exists between the parallel plates 31; and comparing the measured electrostatic capacitance with electrostatic capacitance calculated by the expression 1. This processing may be performed at any time before printing is started. This correction processing is not necessarily performed for each printing, and can be performed, for example, after an image forming device is turned on and returns from a power-saving state.

Figure 9:
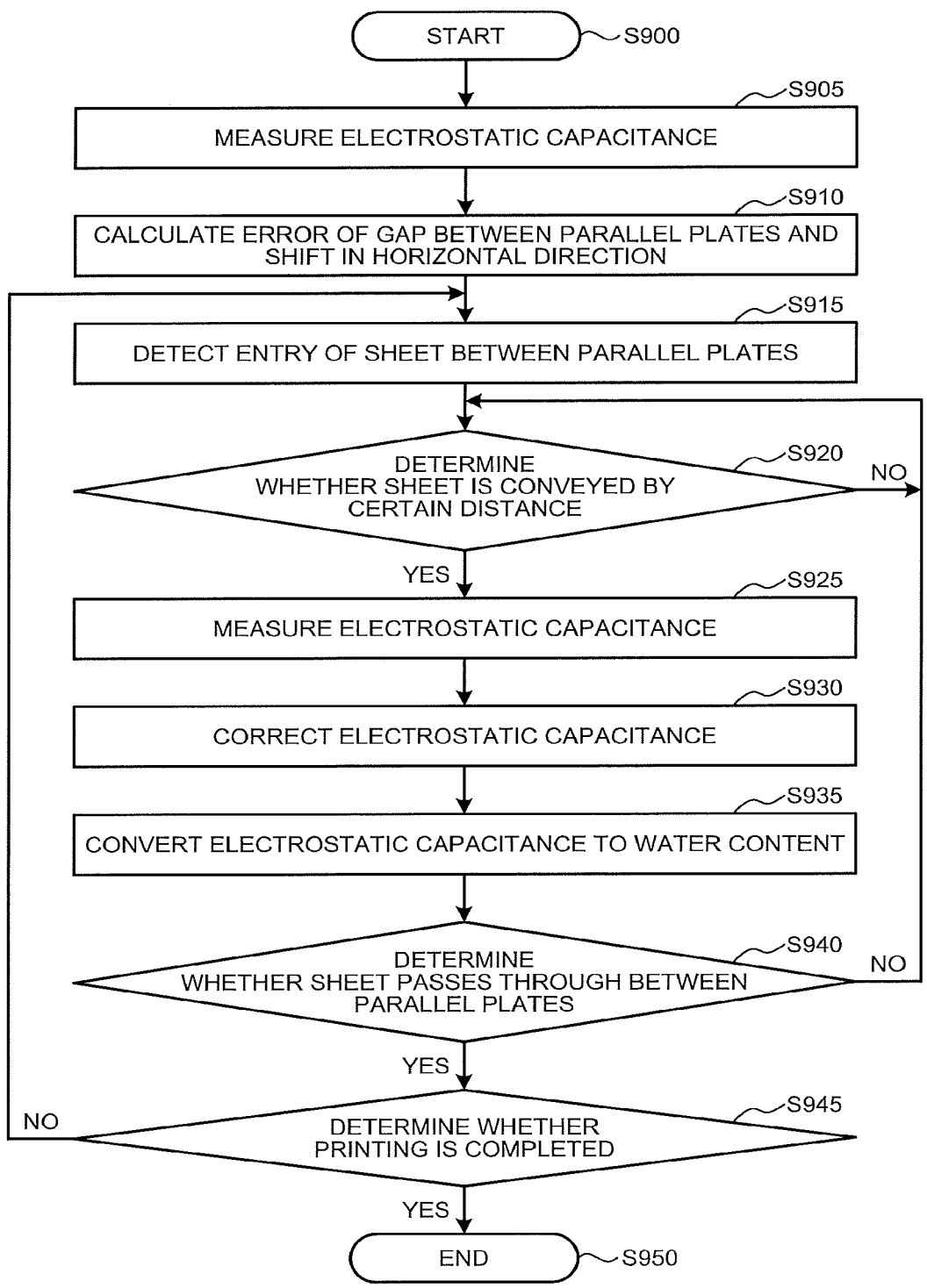
FIG. 9 is a flowchart illustrating a second example of processing that is executed by the water content measuring device.

FIG. 9 is a flowchart illustrating another example of processing for measuring water content. Processing starts from step S900, and electrostatic capacitance is measured in a state where nothing exists between the parallel plates 31 at step S905. At step S910, an error in the area and the like of parallel plates 31 and a positional deviation thereof in the horizontal direction are calculated. Because processing at step S915 to S925 and after steps S935 is the same as that at steps S805 to S835 illustrated in FIG. 8, the explanation is omitted.

At step S930, the electrostatic capacitance is corrected based on the error and the positional deviation calculated at step S910. For example, the electrostatic capacitance can be corrected by measuring a correction coefficient (correction parameter) from the calculated error and positional deviation and multiplying the electrostatic capacitance by the calculated correction parameter. Herein, the electrostatic capacitance is corrected. Alternatively, water content after conversion may be corrected.

A dielectric constant when the sheet 34 is conveyed between the parallel plates 31 varies depending on temperature of a housing unit that houses the sheet 34, moisture in the housing unit, thickness of a sheet, a sheet size, and the like, besides the water content of the sheet 34. The reasons are as follows. The dielectric constant of the air is not affected by temperature and moisture, but water content of the sheet 34 varies depending on temperature and moisture, and the dielectric constant varies due to change in water content. When thickness or size of the sheet 34 is changed, a volume ratio of the air between the parallel plates 31 and the sheet 34 varies, and a dielectric constant varies due to the change in volume ratio.

These factors affecting the electrostatic capacitance can be input as a parameter for selecting, for example, a table used in converting the measured electrostatic capacitance to water content. When a table corresponding to a thickness of a sheet is stored, thickness of a sheet used for printing is input so as to select a table corresponding to the input thickness, and the measured electrostatic capacitance can be converted to water content using the selected table. In this manner, precise water content can be obtained.

FIG. 10 is a flowchart illustrating still another example of processing for measuring water content. Processing starts from step S1000, and at step S1005, an ambient temperature and the like are measured by a different device such as a thermometer and are input as a parameter affecting electrostatic capacitance. Because processing after step S1010 is the same as that at steps S805 to S835 illustrated in FIG. 8, the explanation is omitted. At step S1025, a table corresponding to an input parameter is selected and electrostatic capacitance is converted to water content using the table.

Correction processing illustrated in FIG. 9 may be applied to processing that includes parameter input illustrated in FIG. 10. When there is no corresponding table, water content corresponding to electrostatic capacitance can be calculated using the interpolation method, for example.

By using the electrostatic capacitance sensor 17 that has the above-described configuration and performs the above-described processing, even one sensor can obtain water content of a plurality of areas on the sheet 34 and obtain a water content distribution. Thus, an image forming device performs image forming control corresponding to the obtained water content. Examples of image forming control include control of changing a heating condition corresponding to a water content distribution so as to decrease bending (curling) of the sheet 34 occurring in fixing. This control can reduce deterioration in print quality and a paper jam.

According to the present invention, a water content distribution of an object to be measured can be obtained using one device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. A water content measuring device that measures water content of an object to be measured, the water content measuring device comprising:

two plates that are disposed facing each other;

current generating circuitry that generates current supplied between the two plates;

measuring circuitry that measures electrostatic capacitance generated by the current supplied between the two plates; and arithmetic processing circuitry configured to convert the electrostatic capacitance measured by the measuring circuitry to water content, wherein the two plates each have a shape or are disposed such that at least two points on a leading edge of the object enter between the two plates at different timings in a direction perpendicular to a passing direction in which the object passes through the two plates, wherein:

an edge of each of the two plates has a stepped shape, and said edge having the stepped shape is disposed to face the leading edge of the object, the measuring circuitry measures the electrostatic capacitance a plurality of times such that there is an electrostatic capacitance measurement for different positions of the object to be measured, relative to the two plates, and the arithmetic processing circuitry calculates electrostatic capacitance of plural areas of the object using the measured electrostatic capacitance and a volume ratio which is different for the different positions.

2. The water content measuring device according to claim 1, wherein:
the object is a sheet, and
the water content measuring device further comprises:
a memory that stores at least one of information on temperature of a housing which houses the sheet, information on moisture of the housing, information on thickness of the sheet, and information on size of the sheet, and
the arithmetic processing circuitry converts the electrostatic capacitance measured by the measuring circuitry to the water content based on the at least one of the information on temperature, the information on moisture, the information on thickness of the sheet, and the information on size of the sheet stored in the memory.

3. An image forming device comprising
the water content measuring device according to claim 1, wherein
the image forming device forms an image corresponding to the water content measured by the water content measuring device.

4. A measuring method of measuring water content of an object to be measured, the measuring method comprising:
supplying current between two plates facing each other;
measuring electrostatic capacitance generated by the current supplied between the two plates; and
converting the measured electrostatic capacitance to water content, wherein
the two plates each have a shape or are disposed such that at least two points on a leading edge of the object enter between the two plates at different timings in a direction perpendicular to a passing direction in which the object passes through the two plates,
wherein:
an edge of each of the two plates has a stepped shape, and said edge having the stepped shape is disposed to face the leading edge of the object,
the measuring measures the electrostatic capacitance a plurality of times such that there is an electrostatic capacitance measurement for different positions of the object to be measured, relative to the two plates, and
the converting calculates electrostatic capacitance of plural areas of the object using the measured electrostatic capacitance and a volume ratio which is different for the different positions.

5. The measuring method according to claim 4, wherein:
the object is a sheet, and
the measuring method further comprises:
storing at least one of information on temperature of a housing which houses the sheet, information on moisture of the housing, information on thickness of the sheet, and information on size of the sheet, and
at the converting, the electrostatic capacitance measured at the measuring of the electrostatic capacitance to the water content based on the at least one of the information on temperature, the information on moisture, the information on thickness of the sheet, and the information on size of the sheet stored in the memory.

6. A water content measuring device that measures water content of an object to be measured, the water content measuring device comprising:
two plates that are disposed facing each other;
current generating circuitry that generates current supplied between the two plates;
measuring circuitry that measures electrostatic capacitance generated by the current supplied between the two plates; and
arithmetic processing circuitry configured to convert the electrostatic capacitance measured by the measuring circuitry to water content, wherein
the two plates each have a shape or are disposed such that at least two points on a leading edge of the object enter between the two plates at different timings in a direction perpendicular to a passing direction in which the object passes through the two plates,
wherein:
an edge of each of the two plates increases a length of the plates with respect to a change in a widthwise direction, said edge is disposed to face the leading edge of the object,
the measuring circuitry measures the electrostatic capacitance a plurality of times such that there is an electrostatic capacitance measurement for different positions of the object to be measured, relative to the two plates, and
the arithmetic processing circuitry calculates electrostatic capacitance of plural areas of the object using the measured electrostatic capacitance and a volume ratio which is different for the different positions.

\* \* \* \* \*